(12) United States Patent
Tutuianu et al.

(10) Patent No.: US 10,715,387 B1
(45) Date of Patent: Jul. 14, 2020

(54) SYSTEM FOR DYNAMIC PROVISIONING OF HOST DEVICES

(71) Applicant: AMAZON TECHNOLOGIES, INC., Seattle, WA (US)

(72) Inventors: Aurelian Tutuianu, Iasi (RO); Marian-Razvan Udrea, Iasi (RO); Daniel Voinea, Iasi (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 66 days.

(21) Appl. No.: 16/003,458

(22) Filed: Jun. 8, 2018

(51) Int. Cl.
*H04L 12/24* (2006.01)
*H04L 12/927* (2013.01)
*H04L 12/911* (2013.01)
*H04L 12/26* (2006.01)
*G06F 9/50* (2006.01)
*H04L 29/08* (2006.01)

(52) U.S. Cl.
CPC ........ *H04L 41/0823* (2013.01); *G06F 9/5005* (2013.01); *H04L 41/0806* (2013.01); *H04L 41/0896* (2013.01); *H04L 41/5012* (2013.01); *H04L 41/5019* (2013.01); *H04L 43/08* (2013.01); *H04L 43/0876* (2013.01); *H04L 47/783* (2013.01); *H04L 47/801* (2013.01); *H04L 47/822* (2013.01); *H04L 47/826* (2013.01); *G06F 2209/5019* (2013.01); *H04L 67/10* (2013.01)

(58) Field of Classification Search
CPC . H04L 41/0896; H04L 41/5012; H04L 43/08; H04L 43/0876; H04L 41/0806; G06F 2209/5019; G06F 9/5005
See application file for complete search history.

(56) References Cited

U.S. PATENT DOCUMENTS

| | | | |
|---|---|---|---|
| 6,501,737 B1 * | 12/2002 | Mathal | H04L 47/2416 370/252 |
| 9,118,722 B1 * | 8/2015 | Gershon | H04L 67/10 |
| 9,647,919 B1 * | 5/2017 | Arguelles | G06F 11/3433 |
| 9,800,455 B1 * | 10/2017 | Upshur | H04L 29/08072 |
| 10,013,200 B1 * | 7/2018 | Shveidel | G06F 3/0638 |
| 10,365,985 B2 * | 7/2019 | Wagner | G06F 8/43 |
| 10,409,649 B1 * | 9/2019 | Young | G06F 9/4881 |
| 10,423,456 B2 * | 9/2019 | Dong | G06Q 10/04 |
| 10,437,629 B2 * | 10/2019 | Wagner | G06F 9/4887 |
| 2006/0209841 A1 * | 9/2006 | Amorello | H04L 47/10 370/395.21 |

(Continued)

*Primary Examiner* — Lashonda T Jacobs
(74) *Attorney, Agent, or Firm* — Lindauer Law, PLLC

(57) ABSTRACT

Techniques for dynamically provisioning host devices to process requests and other types of received data include receiving traffic data that indicates an amount of data received by the host devices over time and resource data that indicates an amount of computing resources used by the host devices to process the data. Host data is generated that indicates a relationship between received quantities of data and corresponding quantities of computing resources used to process the data. Based on the host data, a number of host devices used to process a predicted amount of data to be received at a future time, using a selected amount of computational resources, may be determined. Based on the determined number of devices, additional host devices are provisioned to process the received data, or diverted from processing the data.

20 Claims, 6 Drawing Sheets

(56) References Cited

U.S. PATENT DOCUMENTS

| | | | | |
|---|---|---|---|---|
| 2007/0230437 A1* | 10/2007 | Schopf | ............... | H04L 47/724 370/352 |
| 2010/0205292 A1* | 8/2010 | Diaz | ............... | H04L 12/40013 709/224 |
| 2011/0161126 A1* | 6/2011 | Best | ............... | G06Q 10/06 705/7.13 |
| 2015/0195149 A1* | 7/2015 | Vasseur | ............... | H04L 41/5009 370/252 |
| 2015/0288571 A1* | 10/2015 | Baughman | ............... | H04L 41/145 703/21 |
| 2017/0111233 A1* | 4/2017 | Kokkula | ............... | H04L 41/0823 |
| 2018/0158322 A1* | 6/2018 | McDonnell | ............... | H04W 4/46 |
| 2018/0287956 A1* | 10/2018 | Bryc | ............... | H04L 47/70 |
| 2019/0182120 A1* | 6/2019 | Coccia | ............... | G06N 20/00 |
| 2019/0250949 A1* | 8/2019 | Chen | ............... | H04L 41/082 |
| 2019/0319881 A1* | 10/2019 | Maskara | ............... | H04L 47/72 |

\* cited by examiner

SYSTEM FOR DYNAMIC PROVISIONING OF HOST DEVICES

BACKGROUND

Fleets of servers or other types of computing devices may execute services that are used to process received requests or other types of data. The number of devices that are used to process the received data and the amount of data that is received may affect the processor utilization or other computing resources used for each host device, which may in turn affect user experiences, such as the rate at which requests are processed.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
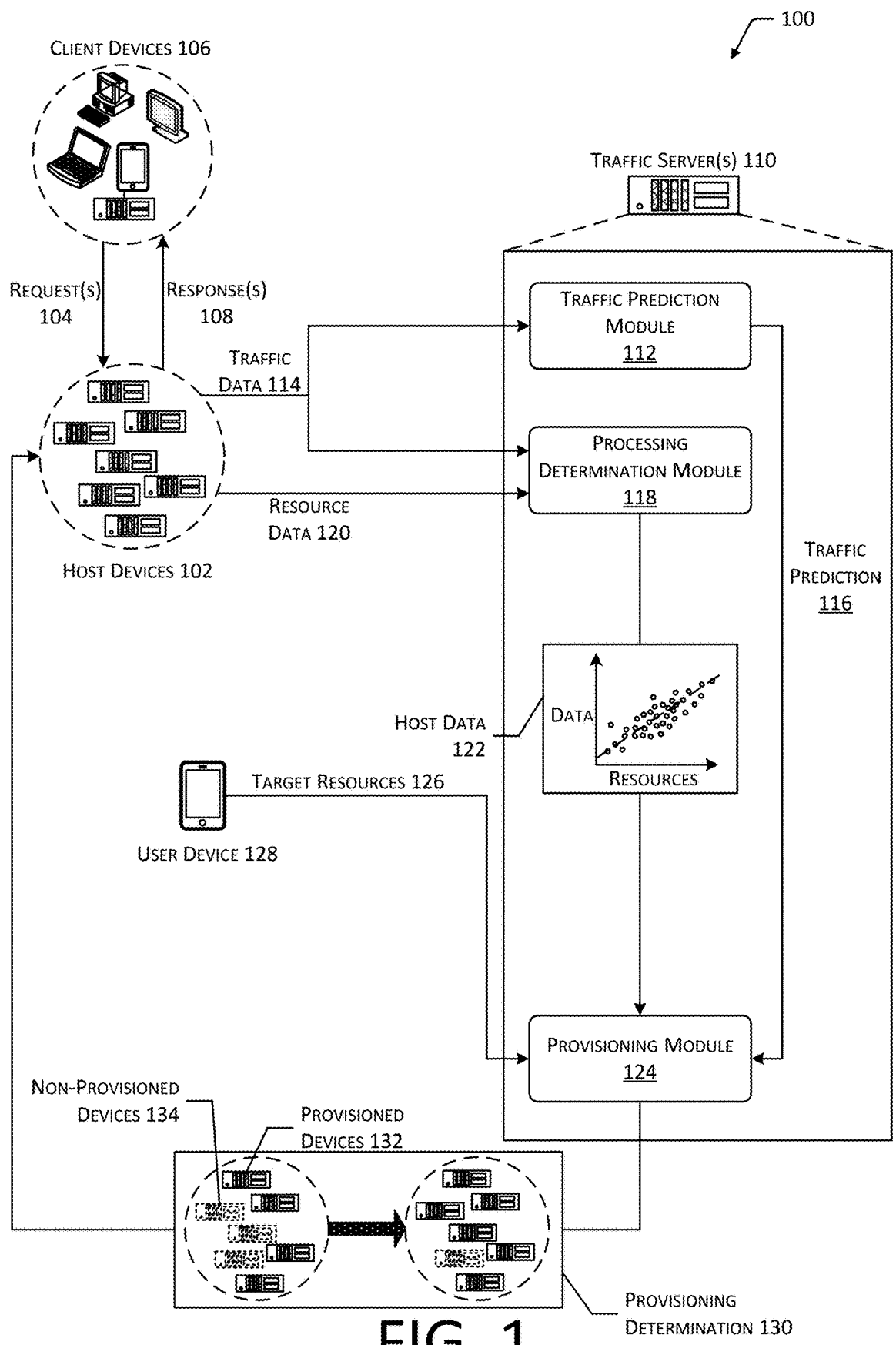
FIG. 1 depicts an implementation of a system for determining a number of host devices to be used to process requests.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A group of servers or other types of computing devices, often termed a fleet of host devices, may be used to process requests received from other computing devices. For example, a fleet of host devices may execute a service to process a particular type of request, and each host device within the fleet may be assigned to process the requests or other types of received data (e.g., traffic) that is received at a particular time. When a large amount of data is received by a group of computing devices, the computing resources used by each individual host device to process the data may increase. For example, when a quantity of received data increases, the processor utilization for each host device may increase as the larger quantity of data is processed. If the processor utilization or other computing resources for a group of computing devices increases significantly, this may reduce the ability of the computing devices to process the data rapidly, which in turn may reduce the rate at which responses are provided based on received requests. For example, a fleet of host devices may have an associated threshold level of processor utilization, and if the processor utilization of the host devices exceeds the threshold level, requests may cease being processed within a time limit that is acceptable under a Service Level Agreement (SLA) or that provides a positive user experience. In some cases, if the amount of traffic received by a fleet of host devices causes the processor utilization of the host devices to exceed a threshold level, the host devices may fail to process one or more requests, resulting in an outage.

To prevent the quantity of computing resources used to process the data from exceeding a threshold level, the number of computing devices used to process the data may be reactively increased as the quantity of received data increases, and decreased as the quantity of received data decreases. For example, the number of host devices within a fleet that are provisioned and assigned to process a particular type of request may be dynamically modified based on a current number of received requests. Scaling the number of host devices used based on the received traffic may prevent the computing resources used by the host devices from exceeding a threshold level. However, this reactive approach may be unsuitable for use in large-scale systems. In some cases, a significant length of time, such as fifteen to thirty minutes or more, may be used to provision a server or other type of computing device to respond to a particular type of request. For example, diverting a computing device from an existing task to begin executing another service and acquiring the data and other resources to do so may, itself, consume time and computing resources. If a large-scale system experiences a significant increase in received traffic, the increased traffic may cause the computing resources used by the current number of provisioned host devices to exceed a threshold level before additional computing devices may be provisioned to begin processing the traffic. In such a case, the excessive use of computing resources by the current host devices may result in an outage, failed requests, or processing requests at a slower rate that causes a negative user experience. In some cases, the effect of changes in traffic on a large-scale system may be at least partially mitigated by maintaining a large number of host devices, often in excess of the number of host devices needed to process the traffic, so that if a large increase in received traffic occurs, the excess number of host devices may process the traffic without resulting in an outage or a slower rate of processing. However, such an approach may increase the expense and computational cost associated with processing requests and other types of data due to the provisioning of unnecessary computing resources during times when smaller quantities of data are received.

Described in this disclosure are techniques for dynamically controlling a number of computing devices used to process requests and other types of data, in advance of a predicted increase or decrease in the amount of data received. In other implementations, rather than controlling a number of computing devices that are used, a number of processing units assigned to act on a particular service may be controlled. For example, a particular computing device may be associated with multiple processing units, such as processors, cores, virtual machines, memory allocated to performance of services, and so forth. Continuing the example, a capacity unit, such as a read unit or write unit for a database, may constitute a processing unit. Over time, the number of requests or other representations of the quantity of data received by a group of computing devices, such as a number of bytes or other measurements of data quantities or work performed to process received data, may be determined and used to predict quantities of data that may be received at future times. For example, a group of computing devices used to process requests to access item information and complete purchase transactions associated with an online marketplace may historically receive a larger number of requests during weekends and holidays, and a smaller number of requests on weeknights between the hours of 12:00 and 3:00. However, the quantity of data received at a particular time may not directly indicate the number of computing devices that may be used to process the data while maintaining the computing resources used by each of the computing devices at an amount less than a threshold level.

As such, implementations described herein may determine a first quantity of data received by a group of computing devices during a first time period. The quantity of computing resources used by the group of computing devices to process the first quantity of data may also be determined. In some implementations, computing resources used may include a processor utilization for individual computing devices. For example, throughout the first period of time, multiple data points may be determined, each data point including a value for the quantity of data received, which may be expressed as a count of requests, a count of bytes, a count of instances that a service is performed, or another measurement of work performed by a device, and a value for the quantity of computing resources used, which may be expressed as a percentage of processor utilization for individual computing devices of the group. These data points may be used to generate host data indicative of a relationship between the quantity of data received by the group of computing devices, or other measurement of work performed by the computing devices, and the quantity of computing resources used to process the received data. In some implementations, a linear regression analysis may be performed, using the quantities of data and the associated quantities of computing resources as inputs to determine a generally linear function associating quantities of received data with quantities of used computing resources. In other implementations, a machine learning algorithm may be used to determine other types of functions that associate quantities of received data with quantities of computing resources. For example, an expectation maximization algorithm may be iteratively performed to determine the parameters of a function that associates quantities of received data with quantities of computing resources.

Based on the host data and the current number of computing devices used to process the data received during the first time period, quantities of data that are processed by an individual host device of the group, at different quantities of used computing resources, may be determined. A threshold quantity of computing resources may also be determined. The threshold quantity of computing resources may represent a level of processor utilization or other type of computing resources that, if exceeded, may slow or prevent the processing of data. For example, a threshold quantity of computing resources may be selected to prevent the slowing of processing to an extent that may violate a SLA or provide a negative user experience. In some implementations, the threshold quantity of computing resources may be selected via user input. In other implementations, the threshold quantity of computing resources may be selected based on a target rate at which received requests are to be processed. For example, user input or a SLA may indicate that a received request is to be processed in three seconds or less. A corresponding quantity of used computing resources that may enable a request to be processed at this target rate may be determined. For example, processor utilization of a host device that is greater than fifty percent may prevent processing of a request within three seconds. Based on the target rate for processing requests, the threshold quantity of computing resources may be set to fifty percent of processor utilization, or less. In still other implementations, the threshold quantity of computing resources may be selected based on other functions performed by the group of computing devices. For example, if a group of computing devices is configured to process two types of requests, and processor utilization in excess of a threshold level to process a first type of request will prevent the devices from processing the second type of request at a target rate, the threshold quantity of computing resources may be set to a level of processor utilization that will avoid decreasing the rate of processing other types of requests below the target rate.

During a second time period, subsequent to the first time period, a predicted quantity of traffic may be determined. As discussed previously, quantities of data historically received by a group of computing devices over time may be used to predict quantities of data that may be received at future times. For example, traffic data that associates quantities of data with particular time periods may be used to determine a predicted count of requests or another measurement of a quantity of data that may be received during a future time period. Based on the determined host data, the target quantity of computing resources, and the amount of data processed by a single computing device using the target quantity of computing resources, a count of computing devices that may process the predicted count of requests using the target quantity of computing resources may be determined. If the determined count of computing devices is greater than the current count of computing devices in the group, one or more additional computing devices may be provisioned and assigned to processing the received data. If the determined count is less than the current count, one or more computing devices may cease processing requests and in some cases may be assigned to perform other tasks. In some implementations, a length of time used to provision a computing device to process received data may be determined, and provisioning of the additional computing devices may be initiated at a time prior to receipt of the predicted quantity of data so that the computing devices are provisioned when the data is received. In some cases, counts of computing devices, or other types of processing units, to be used to process predicted quantities of future traffic may be determined for multiple future time periods. For example, predicted quantities of data to be received by a fleet of host devices may be determined for a twenty-four-hour period, and multiple counts of host devices to be provisioned to process the predicted data for each hour of the twenty-four-hour period may be determined. The determined counts of host devices may be modified as additional host data is generated or additional predicted quantities of data are received. Determining multiple counts of host devices for use at future times may enable a fleet of host devices to be prepared to process received data at times when a system is unable to generate additional traffic predictions or determine additional counts of host devices for use by using a count of host devices that was determined previously.

In some implementations, the count of computing devices that may be provisioned to process data may be restricted by a threshold minimum count, a threshold maximum count, or both a threshold minimum and a threshold maximum count. In such cases, if the determined count of computing devices is greater than the threshold maximum count or less than the threshold minimum count, the count of provisioned computing devices may be set to the corresponding threshold value. In some implementations, a notification indicating that the threshold value has been exceeded may be generated.

Additionally, in some implementations, multiple relationships between quantities of received data and quantities of computing resources used may be determined. For example, a group of computing devices may receive and process two types of requests during the first time period. Processing of the first type of request may utilize a greater quantity of computing resources than processing the second type of request. Over time, data points that associate quantities of received data with quantities of computing resources used may indicate multiple clusters, lines, or other arrangements that indicate multiple relationships or functions. In such a case, use of linear regression, expectation maximization, machine learning, or other techniques may determine more than one relationship between received data and computing resources. In these cases, a ratio of received data to used computing resources may be determined for each relationship, and the count of host devices may be determined based on the relationship having the lowest ratio. For example, an expectation maximization algorithm for Gaussian linear mixture models may be used to fit a mixture of linear regression functions to multiple clusters of data points that associate processed data to used computing resources. Use of such an algorithm may include identifying all possible linear models within a set of data points, independent of the time that the data points were acquired, then identifying the time segments that correspond to distinct ranges of values for the data points.

As one skilled in the art will appreciate in light of this disclosure, certain embodiments may be capable of achieving certain advantages, including some or all of the following: Dynamic modification of a number of computing devices used to process requests and other types of data, in advance of receiving a predicted quantity of data, may enable computing resources used to process data to be minimized when smaller amounts of data are received, conserving expenses and enabling computing resources to be used for other purposes. During times of increased traffic, increasing the number of computing devices to be used in advance of the traffic may enable the predicted traffic to be processed at the time it is received, preventing outages, failed requests, or slower processing of requests that may otherwise be caused by a sudden increase in traffic. Modification of the number of computing devices to be used in advance of receiving the predicted quantity of data may therefore be especially suited to use with large-scale systems, where a length of time may pass before additional devices may be provisioned for use processing the data, and the quantities of increased data that are received may be significant. Implementations described herein may also convert non-actionable measurements, such as amounts of data received during particular time periods, into an actionable value, such as a number of host devices that may be used to process the received quantity of data using a selected quantity of computing resources. Additionally, implementations described herein do not preclude use of reactive methods to further modify a count of computing devices used to process received data. For example, if a quantity of data received at a future time is larger than a predicted quantity of data, provisioning a number of host devices in advance of receiving the data may prevent an outage, while additional host devices may be provisioned when the data is received in response to the larger quantity than what was predicted.

FIG. 1 depicts an implementation of a system 100 for determining a number of host devices 102 to be used to process requests 104. In other implementations, the system 100 may determine a number of processing units to be used to process received data, rather than a number of computing devices. Specifically, FIG. 1 depicts a fleet of host devices 102, which may include any number and any type of computing devices. For example, while FIG. 1 depicts the host devices 102 as a group of servers, the host devices 102 may include, without limitation, mobile devices, set-top boxes, tablet computers, personal computers, wearable computers, servers, or any other type of computing devices. Additionally, while FIG. 1 depicts the host devices 102 including seven representative servers for illustrative purposes, the group of host devices 102 may include any number of computing devices ranging from one computing device to thousands of computing devices, or more.

The host devices 102 may be configured to receive requests 104 or other types of data from client devices 106 or another source of data. For example, a client device 106 may provide a request 104 to a group of host devices 102, which may process the request 104 and generate a response 108 to be provided to the requesting client device 106. The client device 106 may include any type of computing device including, without limitation, the types of computing devices described with regard to the host devices 102. Additionally, while FIG. 1 depicts five illustrative client devices 106, the client devices 106 may include any number of computing devices. In some cases, a single client device 106 may provide a single request 104 to the host devices 102, responsive to which the host devices 102 may provide a response 108 to the client device 106. In other cases, a client device 106 may provide multiple requests 104 to the host devices 102. In still other cases, a single client device 106 may provide a request 104 to the host devices 102 to obtain a response 108 used by multiple client devices 106.

At a particular time, any number of client devices 106 may provide any number of requests 104 to the group of host devices 102. For example, at certain times, the number of requests 104 received by the host devices 102 may be relatively small, while at other times, the number of requests 104 received by the host devices 102 may be significantly larger. Depending on the specific number of host devices 102 provisioned to process requests 104, the quantity of computing resources used by the host devices 102 to process the requests 104 may increase as the quantity of requests 104 received by the host devices 102 increases. As the quantity of computing resources used by the host devices 102 increases, the rate at which requests 104 are processed may decrease, or in some cases, be at least temporarily prevented. Additionally, the host devices 102 may be used for other tasks in addition to processing requests 104 from the client devices 106. The data associated with other tasks that is received by the host devices 102 and the computing resources used by the host devices 102 to perform the other tasks may also affect the rate at which the requests 104 are processed.

One or more traffic servers 110 may be used to control the number of host devices 102 that are provisioned for use processing requests 104 based on the quantity of requests 104 or other data received by the host devices 102. While FIG. 1 depicts the traffic server(s) 110 as a single server, the traffic server(s) 110 may include any number and any type of computing devices including, without limitation, the types of computing devices described with regard to the host devices 102. Additionally, while FIG. 1 depicts the traffic server(s) 110 as one or more separate devices not included in the host devices 102 or the client devices 106, in other implementations, one or more of the host devices 102 or client devices 106 may perform the functions described with regard to the traffic server(s) 110.

A traffic prediction module 112 associated with the traffic server(s) 110 may receive traffic data 114 from the host devices 102. The traffic data 114 may indicate a quantity of data received by the host devices 102 during particular time periods. In some implementations, the traffic data 114 may include a count of requests 104 received by the host devices 102. In other implementations, the traffic data 114 may include a count of bytes or another measurement of data received by the host devices 102. The traffic prediction module 112 may determine quantities of data received by the host devices 102 and the times at which the quantities of data are received. Based on the quantities of data historically received by the host devices 102, the traffic prediction module 112 may generate a traffic prediction 116 indicative of a quantity of data that is predicted to be received by the host devices 102 at a future time. The traffic prediction 116 may be used to determine a quantity of host devices 102 to provision in preparation for requests 104 or other data that may be received by the host devices 102 at a future time.

A processing determination module 118 associated with the traffic server(s) 110 may also receive traffic data 114 from the host devices 102, as well as resource data 120 indicative of a quantity of computing resources used by the host devices 102 to process the requests 104. For example, resource data 120 may include a quantity of processor utilization for the host devices 102, expressed as a percentage of a maximum or threshold processor utilization value, a number of processor cycles, or other similar metrics. Resource data 120 may also include a quantity or percentage of memory, bandwidth, or other computing resources used to process the requests 104. In some implementations, the resource data 120 may also indicate a number of host devices 102 used to process the data using the indicated quantity of computing resources. Based on the traffic data 114 and the resource data 120, the processing determination module 118 may generate host data 122 indicative of a relationship between quantities of data received by the host devices 102, or another metric indicating the work performed by the host devices 102, and quantities of computing resources used by the host devices 102 to process the data. For example, the processing determination module 118 may determine multiple pairs of values, each pair including a quantity of data received by the host devices 102 and a corresponding quantity of computing resources used by the host devices 102 to process the data. Based on the determined values, the processing determination module 118 may determine a relationship between quantities of data received and quantities of computing resources used, such as by performing a linear regression analysis to determine a generally linear function that associates quantities of received data with quantities of computing resources. In other implementations, one or more expectation maximization algorithms or machine learning algorithms may be used to determine other types of functions that may represent the association between quantities of received data and quantities of computing resources. Based on the relationship represented by the host data 122 and the numbers of host devices 102 used to determine the relationship, a quantity of data processed by a single host device 102 using a corresponding quantity of computing resources may be determined.

A provisioning module 124 associated with the traffic server(s) 110 may determine a quantity of host devices 102, or in other implementations, a quantity of processing units, to be used to process a predicted quantity of data, based on the traffic prediction 116. Specifically, the provisioning module 124 may determine a quantity of target resources 126 to be used by the host devices 102. Then, based on the host data 122 that associates quantities of data with quantities of computing resources, the provisioning module 124 may determine a number of host devices 102 that may be used to process the quantity of data indicated in the traffic prediction 116 using the target resources 126. In some implementations, the quantity of target resources 126 may be determined based on user input. For example, user input indicating the target resources 126 may be received from a user device 128 in communication with the traffic sever(s) 110. Continuing the example, a user may provide user input specifying a threshold level of computational resources that, if exceeded, may cause the host devices 102 to process requests 104 at a rate that would result in a negative user experience. While FIG. 1 depicts the user device 128 as a computing device separate from the host devices 102, client devices 106, or traffic server(s) 110, in other implementations, the user device 128 may include a host device 102, client device 106, or traffic server 110. Additionally, while FIG. 1 depicts the user device 128 as a single smartphone, in other implementations, the user device 128 may include any number and any type of computing devices including, without limitation, the types of computing devices described with regard to the host devices 102. In other implementations, the provisioning module 124 or another module associated with the traffic server(s) 110 may determine the quantity of target resources 126 based on characteristics of the host devices 102, requests 104, traffic data 114, or resource data 120. For example, the quantity of target resources 126 may be determined based on other tasks performed by the host devices 102 in addition to processing the requests 104, a target rate for processing the requests 104, such as a rate indicated in an SLA, and so forth. In such cases, the target resources 126 may be determined in the absence of user input indicating the target resources 126.

Using the relationship between quantities of received data and computing resources used to process the data, represented by the host data 122, and the quantity of predicted data to be received, indicated in the traffic prediction 116, the provisioning module 124 may determine a count of host devices 102 that may be used to process the predicted quantity of data using the quantity of target resources 126. An indication of this determined count of host devices 102 may be provided to the host devices 102 as a provisioning determination 130. If the provisioning determination 130 indicates a count of host devices 102 greater than a current count of host devices 102 that are provisioned to process requests 104, one or more additional host devices 102 may be provisioned to process the requests 104. In some implementations, a length of time used to provision the host devices 102 may be determined, and the provisioning process may be initiated the length of time prior to receipt of the predicted quantity of data. For example, the provisioning determination 130 may be provided to the host devices 102 at a particular time prior to receipt of the predicted quantity of data. As another example, the provisioning determination 130 may include an instruction, command, or other indication of a particular time for initiation of the provisioning process. In cases where the provisioning determination 130 indicates a count of host devices 102 less than a current count of host devices 102 that are provisioned to process requests 104, one or more of the host devices 102 currently processing the requests 104 may cease being used to process the requests 104 and in some cases may be provisioned for performing other tasks.

For example, FIG. 1 depicts a provisioning determination 130 that modifies the host devices 102 from a first state having a first number of provisioned devices 132 and non-provisioned devices 134 to a second state that includes a larger number of provisioned devices 132 and a smaller number of non-provisioned devices 134. For example, the provisioning determination 130 may cause one or more host devices 102 not currently in use processing requests 104 to be provisioned to process requests 104 in anticipation of an increased quantity of traffic.

The provisioning determination 130 may thereby cause a number of host devices 102 to be prepared to process requests 104 in advance of receipt of a predicted amount of traffic, or to cause a number of host devices 102 to cease processing requests 104. The provisioning determination 130 may be based in part on host data 122 that indicates a relationship between quantities of data processed by the host devices 102 and the corresponding quantities of computing resources used to process the quantities of data. For example, based on the host data 122 and counts of host devices 102 used to determine the host data 122, quantities of data processed by an individual host device 102 using corresponding quantities of computing resources may be determined. Then, a count of host devices 102 that may be used to process a predicted quantity of requests 104 using a selected quantity of target resources 126 may be determined. As discussed previously, in other implementations, a provisioning determination 130 may cause types of processing units other than discrete computing devices to be provisioned to process requests 104. For example, a single computing device may be associated with multiple processing units, such as processors, cores, or portions of memory allocated to processing data. As another example, a processing unit may include a capacity unit, such as a read unit or a write unit, associated with a database system.

Figure 2:
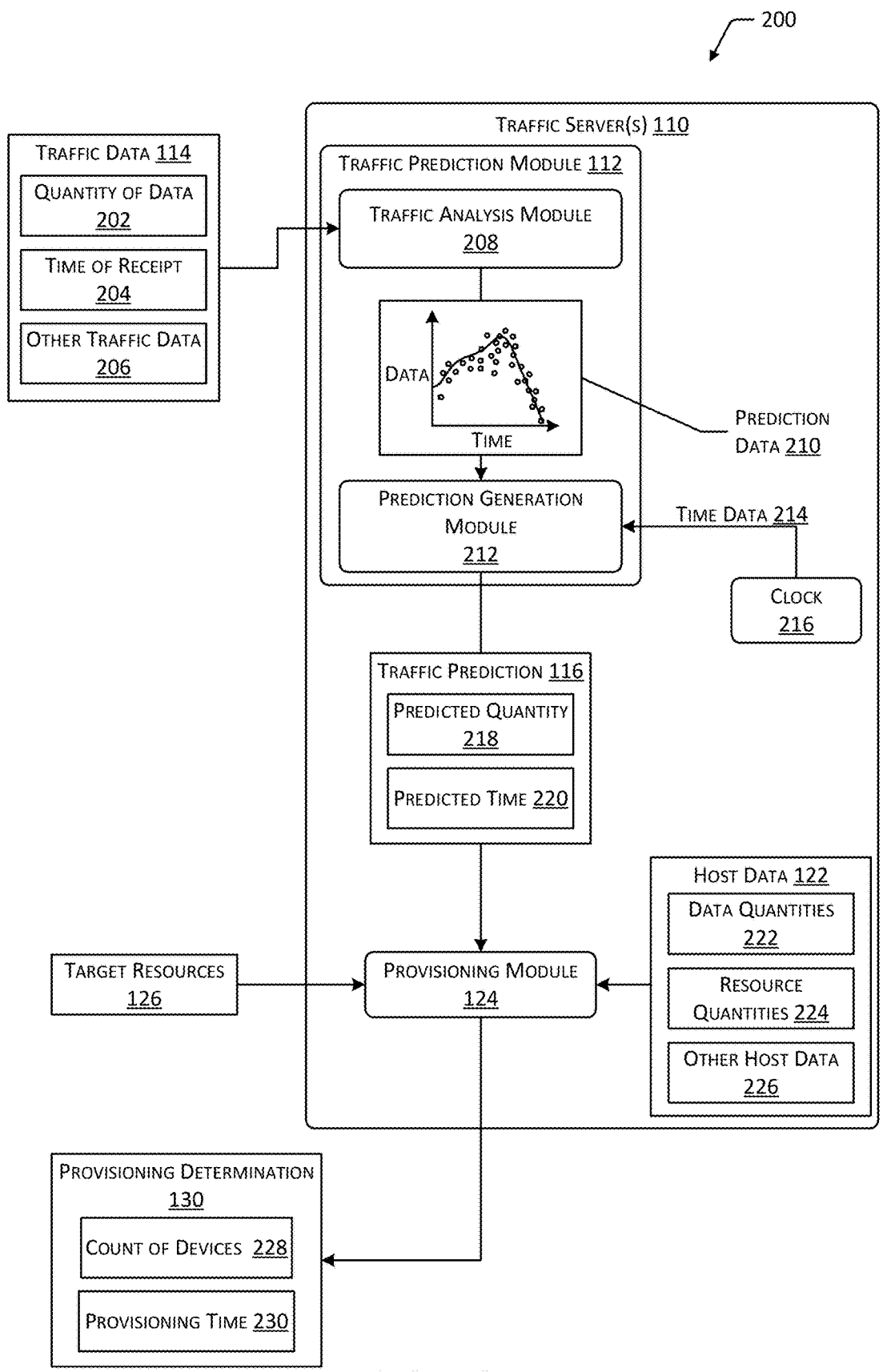
FIG. 2 depicts an implementation of a system for determining a number of host devices to be provisioned based on a predicted quantity of received data.

FIG. 2 depicts an implementation of a system 200 for determining a number of host devices 102 to be provisioned based on a predicted quantity of received data. In other implementations, a number of processing units to be used may be determined rather than a number of computing devices. As described with regard to FIG. 1, one or more traffic servers 110 may receive traffic data 114 indicative of the number of requests 104 or other measurement of received data from a group of host devices 102. For example, a traffic prediction module 112 associated with the traffic server(s) 110 may generate a traffic prediction 116 based on the traffic data 114. The traffic data 114 received from the host devices 102 may include an indication of the quantity of data 202 received by the host devices 102. In some implementations, the quantity of data 202 may include a count of requests 104 received by the host devices 102. In other implementations, the quantity of data 202 may be expressed as a count of bytes or other measurement of data. The traffic data 114 may also include an indication of the time of receipt 204 of the associated quantity of data 202. The time of receipt 204 may include a timestamp or other indication of the particular time at which a particular count of requests, quantity of bytes, or other measurement of the quantity of data 202 was received by the host devices 102. For example, each quantity of data 202 may be associated with a corresponding timestamp that may indicate one or more of the date, day, or time that the quantity of data 202 was received. Other traffic data 206 may include an indication of the types of requests 104 or other data received by the host devices 102, such as an indication of whether received data includes alphanumeric data, video data, audio data, and so forth. Other traffic data 206 may also include an indication of the source of received data, characteristics of a network used to receive the data, performance metrics of the network such as a data rate or error rate, and so forth.

Based on the received traffic data 114, a traffic analysis module 208 of the traffic prediction module 112 may generate prediction data 210 that associates received quantities of data 202 with associated times of receipt 204. In some implementations, the prediction data 210 may include pairs of values that indicate a quantity of received data and an associated time at which the quantity of data 202 was received. For example, the prediction data 210 may include values determined over a period of time and may indicate times when larger and smaller quantities of data 202 are received. Continuing the example, the prediction data 210 may indicate that a large quantity of requests 104 relating to purchases of items through an online marketplace are received during holidays, weekends, and on weekdays between 6:00 and 8:00 P.M., but that only small quantities of requests 104 are received after 10:00 P.M. and before 8:00 A.M.

Based on the prediction data 210 a prediction generation module 212 associated with the traffic prediction module 112 may generate a traffic prediction 116 indicative of one or more quantities of data 202 that are predicted to be received at future times. For example, the prediction generation module 212 may determine time data 214 from a clock 216 or another module associated with the traffic server(s) 110. In other implementations, the time data 214 may be received via user input, from one or more host devices 102, or from one or more client devices 106. The time data 214 may indicate a current timestamp or one or more timestamps associated with future times for which a traffic prediction 116 may be generated. The prediction generation module 212 may determine correspondence between the time data 214 and the prediction data 210 to generate the traffic prediction 116. For example, the time data 214 may indicate a time for which a predicted amount of traffic is to be determined. The prediction data 210 may associate a quantity of data 202 with the time indicated in the time data 214. Based on the prediction data 210 and time data 214, the prediction generation module 212 may generate a traffic prediction 116 that indicates a predicted quantity 218 of traffic and a predicted time 220 at which the predicted quantity 218 may be received by the host devices 102.

As described with regard to FIG. 1, a provisioning module 124 associated with the traffic servers(s) 110 may generate a provisioning determination 130 based in part on the traffic prediction 116. Specifically, the provisioning module 124 may determine, based on host data 122 and the predicted quantity 218 of traffic, a number of host devices 102, or number of processing units, that may be used to process the predicted quantity 218 using a quantity of target resources 126. For example, as described with regard to FIG. 1, the host data 122 may associate various data quantities 222 received by the host devices 102 with corresponding resource quantities 224 used by the host devices 102 to process the received data. Continuing the example, the traffic server(s) 110 may include a processing determination module 118 that receives traffic data 114 indicative of the data quantities 222 and resource data 120 indicative of the resource quantities 224 from the host devices 102. The host data 122 may indicate a relationship between the data quantities 222 and the resource quantities 224. For example, other host data 226 may include an indication of a function that associates data quantities 222 received by the host devices 102 with resource quantities 224 used to process the data. Other host data 226 may also include an indication of the count of host devices 102 or processing units used in association with each data quantity 222 and resource quantity 224. For example, the host data 122 may include multiple sets of data values, each value including a data quantity 222, a resource quantity 224, and a count of host devices 102 used to process the data. Based on the host data 122, the processing determination module 118 or the provisioning module 124 may determine a data quantity 222 processed by an individual host device 102 using a selected resource quantity 224, such as the quantity of target resources 126. This value may be used by the provisioning module 124 to determine a count of devices 228 that may be used to process the predicted quantity 218 of data using the quantity of target resources 126.

As such, the processing determination 130 provided to the host devices 102 may indicate the determined count of devices 228 or processing units and a provisioning time 230. The provisioning time 230 may indicate a time when the provisioning process for the host devices 102 is to be initiated. For example, if a length of time for a host device 102 to be provisioned to process requests 104 is known, the provisioning time 230 may occur before the predicted time 220 when the predicted quantity 218 of data may be received. In other implementations, the provisioning time 230 may indicate a time when the provisioning process is to be completed, and the host devices 102 or another module associated with the traffic server(s) 110 may determine a time at which the provisioning process may be initiated such that the provisioning process is completed prior to the predicted time 220.

Figure 3:
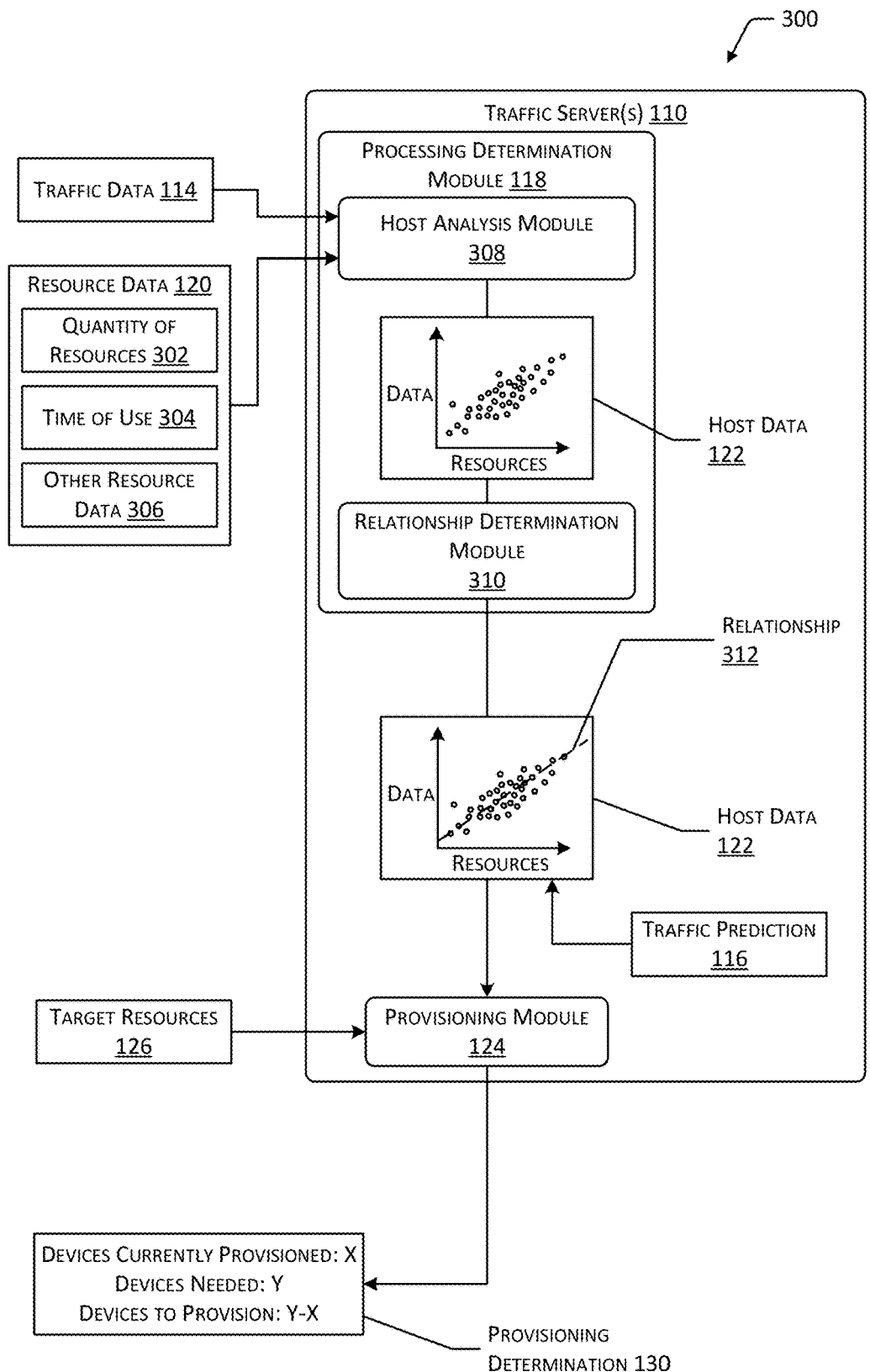
FIG. 3 depicts an implementation of a system for determining a number of host devices to be provisioned based on quantities of received data and quantities of computing resources used by host devices.

FIG. 3 depicts an implementation of a system 300 for determining a number of host devices 102 to be provisioned based on quantities of received data and quantities of computing resources used by host devices 102. As described previously, in other implementations, a quantity of processing units to be used to process received data may be determined rather than a count of computing devices. As described with regard to FIG. 1, one or more traffic servers 110 may receive traffic data 114 and resource data 120 from one or more host devices 102. As described with regard to FIG. 2, the traffic data 114 may associate various quantities of data 202 with corresponding times of receipt 204. The resource data 120 may indicate quantities of resources 302 used to process the received data, indicated by the traffic data 114, at corresponding times of use 304. For example, at a particular time of use 304, a first quantity of data 202 may be received, and a corresponding quantity of resources 302 may be used to process the quantity of data 202. Other resource data 306 may include an indication of the types of computational resources used to process the received data, such as processor utilization, network bandwidth, memory, data storage, and so forth. Other resource data 306 may also indicate a count of host devices 102 used to process an associated quantity of data 202 using the corresponding quantity of resources 302.

A host analysis module 308 associated with the processing determination module 118 may receive the traffic data 114 and resource data 120 and generate host data 122 that associates the received quantities of data 202 with the used quantities of resources. For example, the host data 122 may include one or more sets of associated values, each set including a quantity of data 202 and a corresponding quantity of resources 302 used to process the data. In some implementations, a set of values may also include one or more of a time of use 304 associated with the values or a count of host devices 102 used to process the data.

A relationship determination module 310 associated with the processing determination module 118 may determine one or more relationships 312 based on the sets of values indicated in the host data 122. In some implementations, the relationship determination module 310 may use a linear regression analysis to determine a relationship 312 representative of a generally linear function that associates quantities of data 202 processed by the host devices 102 with quantities of resources 302 used to process the data. In other implementations, the relationship determination module 310 may use expectation maximization algorithms or machine learning algorithms to determine a relationship 312 indicative of a function that associates the quantities of data 202 with the quantities of resources 302. Based on the host data 122 and relationship 312, the relationship determination module 310, the provisioning module 124, or another module associated with the traffic server(s) 110 may determine quantities of data 202 processed by individual host devices 102 using associated quantities of resources 302. As described with regard to FIG. 2, based on the host data 122 and the determined relationship 312, the provisioning module 124 may generate a provisioning determination 130 indicating a count of devices 228 that may be used to process a predicted quantity 218 of data using a quantity of target resources 126.

Figure 4:
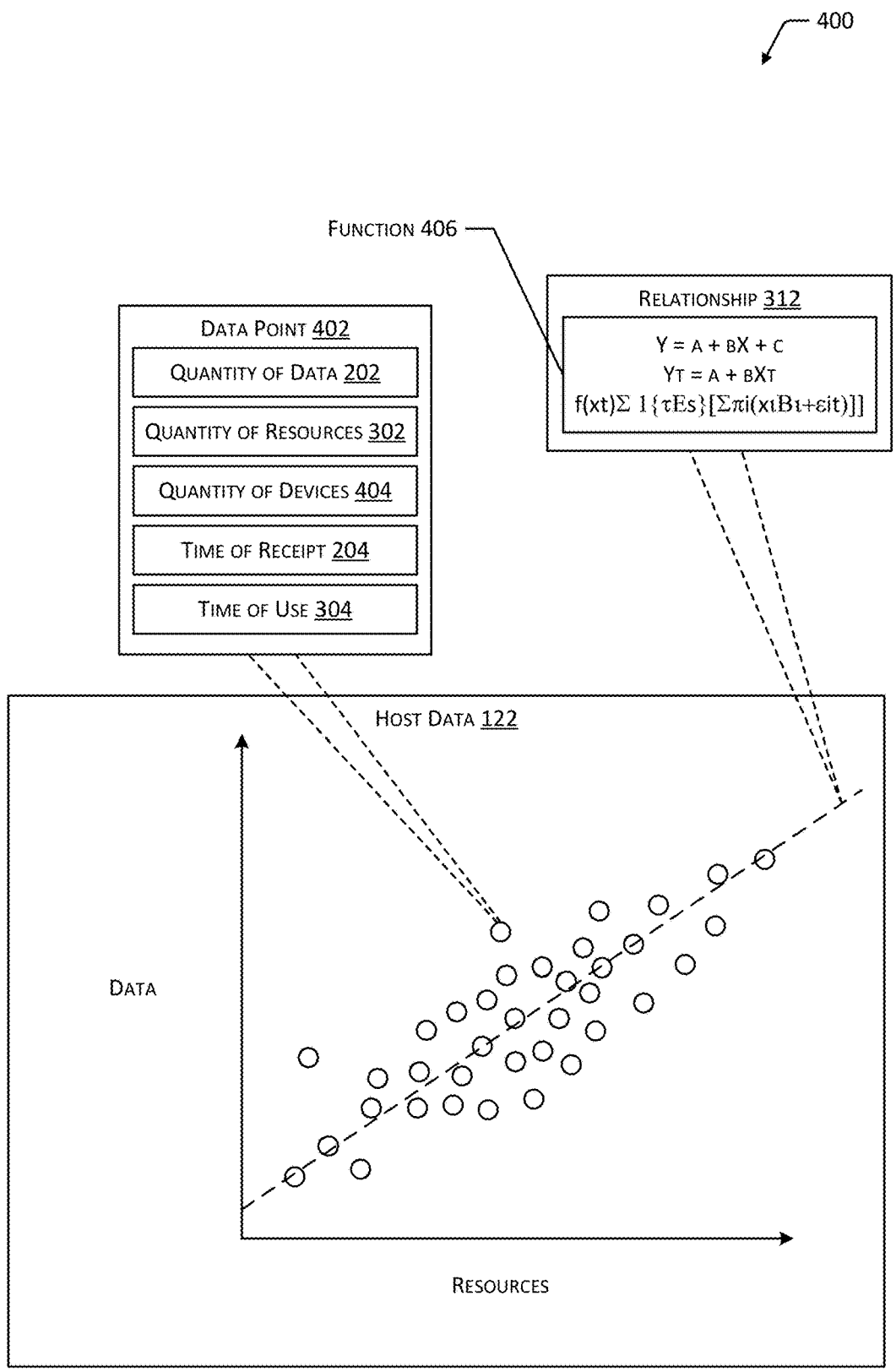
FIG. 4 is a diagram depicting an example implementation of host data that may be used to determine a count of host devices to use to process received data.

FIG. 4 is a diagram 400 depicting an example implementation of host data 122 that may be used to determine a count of host devices 102 to use to process received data. As described with regard to FIGS. 1-3, host data 122 may be generated based on traffic data 114 and resource data 120 received from a group of host devices 102. Traffic data 114 may indicate a quantity of data 202 received by the host devices 102 and a time of receipt 204 of the data. Resource data 120 may indicate a quantity of resources 302 used to process the received data and a time of use 304 associated with the processing of the data. In some implementations, resource data 120 may also indicate a count of host devices 102 currently provisioned to process the data at the time the data was processed.

A processing determination module 118 associated with the traffic server(s) 110 may generate the host data 122 using multiple data points 402. Each data point 402 may include a set of values determined at least in part based on the traffic data 114 and the resource data 120. For example, a data point 402 may include a quantity of data 202 determined using the traffic data 114 and a corresponding quantity of resources 302 determined using the resource data 120. Continuing the example, FIG. 4 depicts the host data 122 represented as a scatter plot with each data point 402 having a position along one axis corresponding to the quantity of data 202 received by the host devices 102 and a position along another axis corresponding to the quantity of resources 302 used by the host devices 102 to process the data. Data points 402 may also include additional data, such as a quantity of devices 404 used to process the associated quantity of data 202 using the corresponding quantity of resources 302. In some implementations, the quantity of data 202 associated with a data point 402 may be modified based on the quantity of devices 404 to determine the amount of data processed by a single host device 102. Data points 402 may additionally indicate one or more of a time of receipt 204 of the data, determined using the traffic data 114, or a time of use 304 of the computational resources, determined using the resource data 120.

The processing determination module 118 may determine a relationship 312 between the quantities of data 202 received by the host devices 102 and the quantities of resources 302 used to process the data based on at least a subset of the data points 402. For example, the relationship 312 may be determined by using a linear regression analysis to determine a function 406 that associates quantities of data 202 with corresponding quantities of resources 302. In other implementations, expectation maximization algorithms or machine learning algorithms may be used to determine functions 406 that corresponds to the data points 402. For example, an expectation maximization algorithm for Gaussian linear mixture models may be used to fit a mixture of linear regression functions to multiple groups of data points 402. Use of such an algorithm may include identifying all possible linear models within a set of data points 402, independent of the time that the data points 402 were acquired, then identifying the time segments that correspond to distinct ranges of values for the data points 402.

One possible regression model that may be used to determine multiple relationships between data points 402 may be represented by the equation:

$$f(xt) = \sum_{s \in S} 1\{t \in s\} \left[ \sum_{i=1}^{Cs} \pi \sum_{i=1}^{Cs} \pi i(xi\beta i + \epsilon it) \right]$$ EQUATION 1

In Equation 1, S represents a set of time intervals, each including distinct behaviors of data points 402, s represents a single time interval, t represents a time index of an observation that may belong to one possible time interval. $1\{t \in s\}$ represents a function that equals 1 if the time index t is in interval s, but 0 otherwise. Cs is a number of linear models found in the time interval s. Pi represents the probability of a mixture component i belonging to a particular relationship 312 within a time interval. βi represents a linear coefficient of the mixture component i. ϵit represents Gaussian noise associated with the mixture component i.

Figure 5:
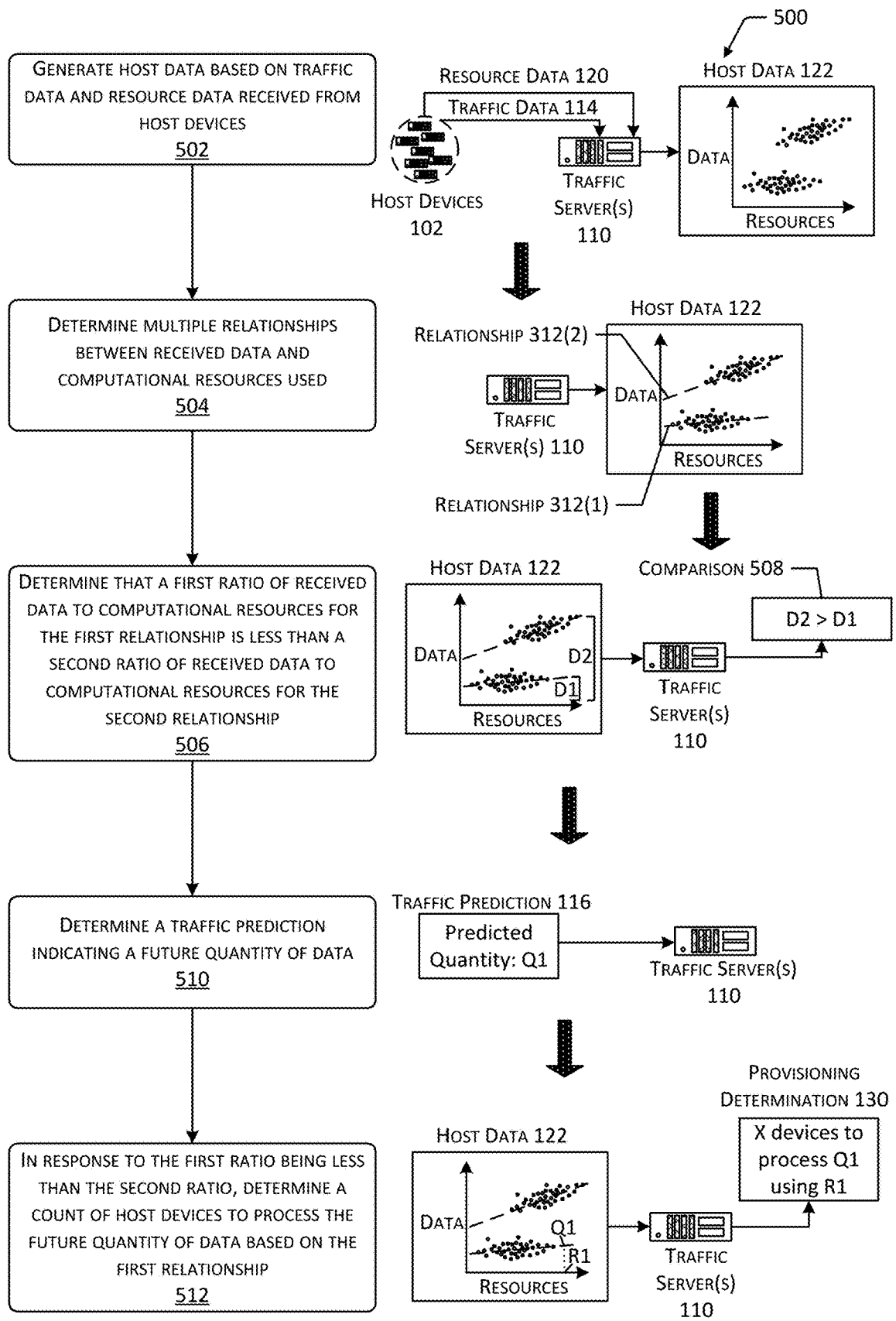
FIG. 5 is a scenario illustrating a method for determining a count of host devices to process received data based on multiple relationships between received data and computational resources used.

FIG. 5 is a scenario 500 illustrating a method for determining a count of host devices 102 to process received data based on multiple relationships 312 between received data and computational resources used. At 502, host data 122 is generated based on traffic data 114 and resource data 120 received from host devices 102. As discussed previously, traffic data 114 may indicate a quantity of data 202 that is received by the host devices 102, while resource data 120 may indicate a corresponding quantity of resources 302 used to process the received data. The host data 122 may associate received quantities of data 202 with corresponding quantities of resources 302. In some implementations, host data 122 may also indicate quantities of devices 404 used to process the received data using the associated computational resources.

In some cases, the host data 122 may include multiple clusters of data points 402 from which multiple relationships 312 may be determined. For example, at 504, multiple relationships 312 may be determined based on the host data 122 generated at 502. Continuing the example, FIG. 5 depicts the host data 122 including two clusters of data points 402. A first cluster of data points 402 may be represented by a first relationship 312(1) while a second cluster of data points 402 is represented by a second relationship 312(2). In some cases, multiple relationships 312 may be determined if the host devices 102 are provisioned to process multiple types of requests 104. For example, a first type of request 104 may include a greater quantity of data 202 than a second type of request 104 or may utilize a greater quantity of resources 302 to process the particular type of data included in the request 104. In such a case, the relationship 312(1) between the quantities of data 202 and quantities of resources 302 associated with the first type of request 104 may differ from the relationship 312(2) between the quantities of data 202 and quantities of resources 302 associated with the second type of request 104.

At 506, a determination may be made that a first ratio of received data to computational resources for the first relationship 312(1) is less than a second ratio of received data to computational resources for the second relationship 312(2). For example, using the same quantity of resources 302, the host devices 102 may process a first type of request 104 that includes a smaller quantity of data 202 than a second type of request 104. The traffic server(s) 110 may generate a comparison 508 between the ratios of received data to used computational resources for each determined relationship 312. While FIG. 5 depicts the host data 122 indicating two relationships 312, in other implementations, the host data 122 may indicate any number of relationships 312 including a single relationship 312 or more than two relationships 312.

At 510, the traffic server(s) 110 may determine a traffic prediction 116 indicating a future quantity of data 202 to be received. As described with regard to FIGS. 1 and 2, a traffic prediction 116 may be generated based on traffic data 114 received over time from the host devices 102 and may indicate a predicted quantity 218 of data to be received at a predicted time 220.

At 512, in response to the first ratio being less than the second ratio, a determination may be made regarding a count of host devices 102 to process the future quantity of data 202 to be received based on the first relationship 312(1) rather than the second relationship 312(2). For example, if a quantity of data 202 were received that included a large quantity of a first type of request 104 that utilized a significant quantity of computing resources 302 for processing, use of a lower count of host devices 102 may cause the amount of resources used to process the requests 104 to exceed the quantity of target resources 126. In some cases, this may cause the processing of one or more requests 104 to fail or decrease the rate at which requests 104 are processed. To account for this possibility, if multiple relationships 312 between quantities of data 202 and quantities of resources 302 are determined, the count of host devices 102 may be determined based on the relationship 312 that includes the smallest ratio of received data to computational resources. In other implementations, a weighted average based on multiple relationships 312 may be used to determine the count of host devices 102 used to process a predicted quantity 218 of data.

Figure 6:
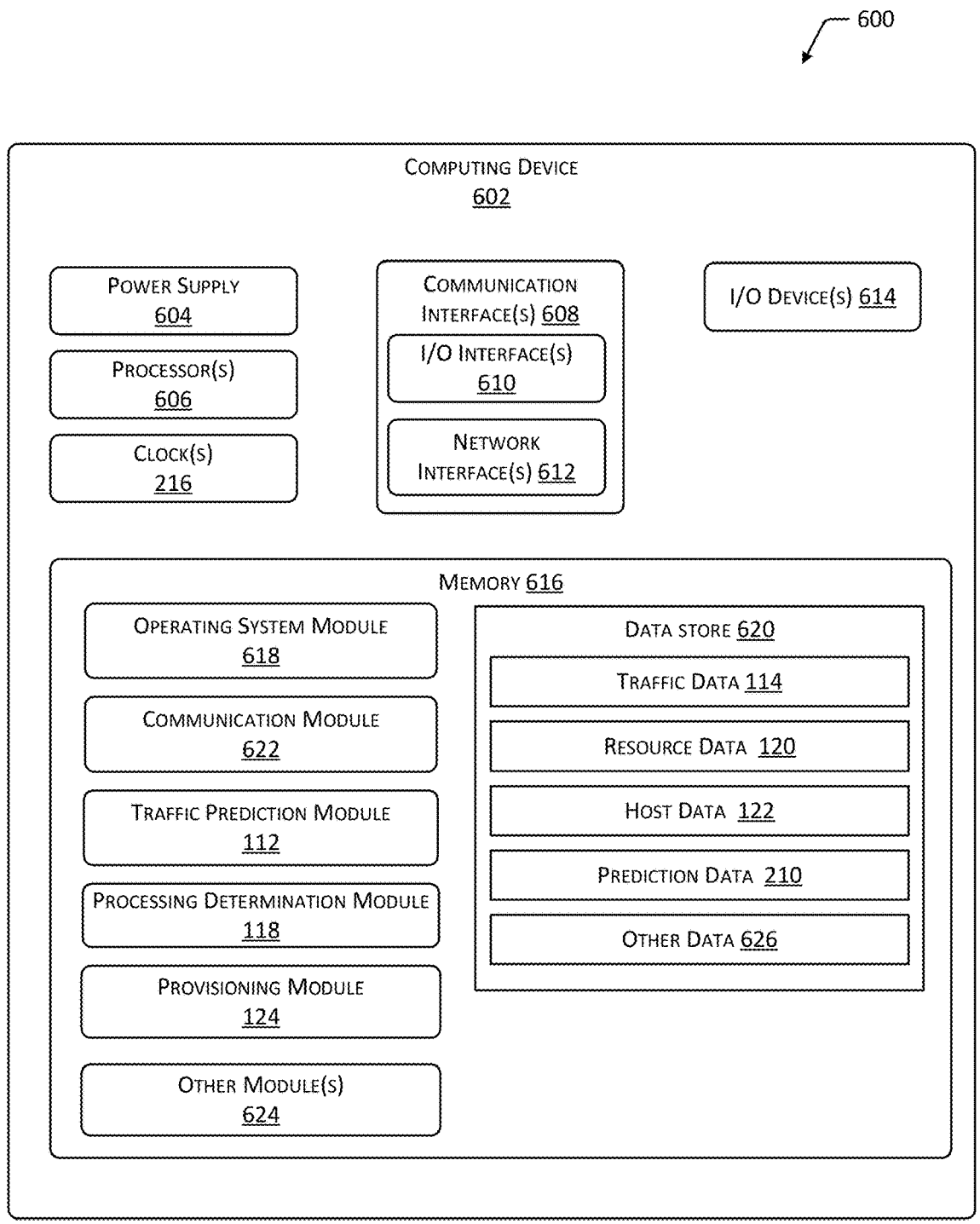
FIG. 6 is a block diagram illustrating a computing device within the scope of the present disclosure.

FIG. 6 is a block diagram 600 depicting a computing device 602 within the present disclosure. The computing device 602 may include the traffic server(s) 110, one or more of the host devices 102, one or more client devices 106, or one or more other computing devices 602 in communication with the traffic server(s) 110, host device(s) 102, or client device(s) 106. While FIG. 6 depicts a single block diagram 600 representative of a computing device 602, any number of networked computing devices 602 may perform the implementations described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 216 may provide information indicative of date, time, ticks, and so forth. For example, the processor(s) 606 may use data from the clock 216 to generate a timestamp, trigger a preprogrammed action, and so forth. As another example, a clock 216 may be used to determine time data 214 indicative of times at which data is received, processed, and so forth. Time data 214 may also be used to determine a time at which processes for provisioning or reassigning computing devices 602 are initiated.

The computing device 602 may include one or more communication interfaces 608, such as input/output (I/O) interfaces 610, network interfaces 612, and so forth. The communication interfaces 608 may enable the computing device 602, or components of the computing device 602, to communicate with other computing devices 602 or components of the other computing devices 602. The I/O interfaces 610 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include any manner of input device or output device associated with the computing device 602. For example, I/O devices 614 may include touch sensors, keyboards, mouse devices, microphones, image sensors (e.g., cameras), scanners, displays, speakers, haptic devices, printers, and so forth. In some implementations, the I/O devices 614 may be physically incorporated with the computing device 602 or may be externally placed.

The network interfaces 612 may be configured to provide communications between the computing device 602 and other devices, such as the I/O devices 614, routers, access points, and so forth. The network interfaces 612 may include devices configured to couple to one or more networks including local area networks (LANs), wireless LANs (WLANs), wide area networks (WANs), wireless WANs, and so forth. For example, the network interfaces 612 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 616. The memory 616 may include one or more computer-readable storage media (CRSM). The CRSM may be any one or more of an electronic storage medium, a magnetic storage medium, an optical storage medium, a quantum storage medium, a mechanical computer storage medium, and so forth. The memory 616 may provide storage of computer-readable instructions, data structures, program modules, and other data for the operation of the computing device 602. A few example modules are shown stored in the memory 616, although the same functionality may alternatively be implemented in hardware, firmware, or as a system on a chip (SoC).

The memory 616 may include one or more operating system (OS) modules 618. The OS module 618 may be configured to manage hardware resource devices such as the I/O interfaces 610, the network interfaces 612, the I/O devices 614, and to provide various services to applications or modules executing on the processors 606. The OS module 618 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 620 and one or more of the following modules may also be associated with the memory 616. The modules may be executed as foreground applications, background tasks, daemons, and so forth. The data store(s) 620 may use a flat file, database, linked list, tree, executable code, script, or other data structure to store information. In some implementations, the data store(s) 620 or a portion of the data store(s) 620 may be distributed across one or more other devices including other computing devices 602, network attached storage devices, and so forth.

The communication module 622 may be configured to establish communications with one or more other computing devices 602, such as to receive and transmit data between host devices 102, client devices 106, and traffic servers 110. Communications may be authenticated, encrypted, and so forth.

The memory 616 may also store the traffic prediction module 112. The traffic prediction module 112 may receive traffic data 114 from host devices 102 and generate prediction data 210 that associates quantities of data 202 that are received with corresponding times of receipt 204. Based on traffic data 114 received over time, the traffic prediction module 112 may generate a traffic prediction 116 that indicates a predicted quantity 218 of traffic that may be received at a predicted time 220. In response to the traffic prediction 116, one or more host devices 102 may be provisioned to process received data, such as in the case of a predicted quantity 218 of traffic that exceeds a current quantity, or may cease processing data if the predicted quantity 218 is less than a current quantity.

The memory 616 may additionally store the processing determination module 118. The processing determination module 118 may receive traffic data 114 and resource data 120 from host devices 102 and generate host data 122 that associates quantities of data 202 received with quantities of resources 302 used by the host devices 102 or processing units to process the data. In some implementations, the processing determination module 118 may determine, based on the host data 122, a quantity of data 202 processed by an individual host device 102 or processing unit using a corresponding quantity of resources 302. Based on the host data 122, the processing determination module 118 may also determine a relationship 312 between quantities of data 202 received by the host devices 102 or processing units and corresponding quantities of resources 302 used to process the received data. The relationship 312 may be used to determine a particular count of devices 228 or processing units to be used to process a predicted quantity 218 of data using a quantity of target resources 126.

The memory 616 may further store the provisioning module 124. The provisioning module 124 may determine a quantity of target resources 126, such as via user input or by determining activities and characteristics of the host devices 102 or processing units and requests 104. For example, the target resources 126 may indicate a threshold amount of processor utilization for individual host devices 102. The provisioning module 124 may also receive a traffic prediction 116 that includes a predicted quantity 218 of data. Based on the host data 122, which indicates a relationship 312 between received quantities of data 202 and quantities of resources 302 used to process the data, the provisioning module 124 may determine a count of host devices 102 or processing units that may process the predicted quantity 218 of data using the quantity of target resources 126. The provisioning module 124 may generate a provisioning determination 130 that causes one or more host devices 102 or processing units to be provisioned to process received data or to cease processing received data. In some implementations, the provisioning determination 130 may be configured to cause the host devices 102 or processing units to initiate a provisioning process or to cease processing data at a particular time, based on the predicted time 220 indicated in the traffic prediction 116. For example, if a provisioning process for a host device 102 may not be completed for thirty minutes, the provisioning determination 130 may be configured to cause the provisioning of the host device 102 to be initiated at least thirty minutes prior to the predicted time 220.

Other modules 624 may also be present in the memory 616. For example, encryption modules may be used to encrypt and decrypt communications between computing devices 602. Authentication modules may be used to authenticate communications sent or received by computing devices 602. Other modules 624 may further include a user interface module, which may provide a user interface for receiving or modifying configurations associated with the computing device 602.

Other data 626 within the data store(s) 620 may include user input data, such as configurations and settings associated with computing devices 602. Other data 626 may include security data, such as encryption keys and schema, access credentials, and so forth. Other data 626 may also include threshold values regarding use of computational resources, maximum or minimum counts of host devices 102 that may be provisioned for certain tasks, and so forth.

In different implementations, different computing devices 602 may have different capabilities or capacities. For example, servers may have greater processing capabilities or data storage capacity than client devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
determine a first quantity of data received by a fleet of host devices during a time period;
determine a first quantity of computing resources used by the fleet of host devices to process the first quantity of data, wherein the first quantity of computing resources is indicative of a first quantity of processor utilization of individual host devices of the fleet of host devices;
determine a first count of host devices of the fleet of host devices used to process the first quantity of data during the time period;
generate host data indicative of a first relationship between the first quantity of data, the first count of host devices, and the first quantity of computing resources;

determine, based on the host data, a second quantity of data processed by an individual host device using the first quantity of processor utilization;

receive user input indicating a second quantity of processor utilization for the individual host device;

access, at a first time, traffic data indicative of a predicted count of requests to be received by the fleet of host devices at a second time subsequent to the first time;

determine, based on the traffic data, a third quantity of data associated with the predicted count of requests;

determine, based on the first relationship indicated by the host data, a predicted count of host devices for processing the third quantity of data using a second quantity of resources that is less than or equal to the second quantity of processor utilization for the individual host device received via the user input;

determine a difference between the predicted count of host devices and a current count of host devices; and based on the difference between the predicted count and the current count, provision one or more host devices to process traffic received by the fleet of host devices.

2. The system of claim 1, further comprising computer-executable instructions to:

determine a length of time for provisioning the one or more host devices;

determine a third time prior to the second time, wherein a difference between the second time and the third time corresponds to the length of time for provisioning the one or more host devices; and cause provisioning of the one or more host devices at the third time.

3. The system of claim 1, further comprising computer-executable instructions to:

perform a linear regression analysis using at least the first quantity of data and the first quantity of computing resources as inputs to generate at least a portion of the host data indicative of the first relationship.

4. The system of claim 1, further comprising computer-executable instructions to:

determine, based on the host data, a second relationship between the first quantity of data, the first count of host devices, and the first quantity of computing resources, wherein the first relationship is indicative of processing of a first type of data by the fleet of host devices and the second relationship is indicative of processing of a second type of data by the fleet of host devices;

determine a first ratio of processed data to computing resources associated with the first relationship;

determine a second ratio of processed data to computing resources associated with the second relationship; and determine that the first ratio is less than the second ratio, wherein the predicted count of host devices is determined based on the first relationship in response to the first ratio being less than the second ratio.

5. A method comprising:

determining a first quantity of data processed using a plurality of processing units associated with at least one host device at a first time;

determining a first quantity of computing resources used by the at least one host device to process the first quantity of data;

determining a first count of processing units of the plurality of processing units used to process the first quantity of data;

determining a first relationship between the first quantity of data, the first count of processing units, and the first quantity of computing resources;

determining a second quantity of data to be processed using the plurality of processing units at a second time subsequent to the first time;

determining a second quantity of computing resources to be used by the plurality of processing units to process the second quantity of data;

determining, based on the first relationship, a third quantity of data processed using an individual processing unit of the plurality of processing units using the second quantity of computing resources;

determining, based on the first relationship, the second quantity of data, and the third quantity of data, a second count of processing units to process the third quantity of data using a quantity of computing resources that is less than or equal to the second quantity of computing resources; and modifying a current count of the plurality of processing units assigned to process the third quantity of data based on the second count of processing units.

6. The method of claim 5, wherein determining the first relationship includes using at least the first quantity of data and the first quantity of computing resources as inputs to an expectation maximization machine learning algorithm to determine at least a portion of the first relationship as an output.

7. The method of claim 5, further comprising:

determining a second relationship between the first quantity of data, the first count of processing units, and the first quantity of computing resources;

determining that the first relationship corresponds to processing of a first type of request and the second relationship corresponds to processing of a second type of request; and determining that a first ratio of processed data to computing resources associated with the first relationship is less than a second ratio of processed data to computing resources associated with the second relationship, wherein the current count of processing units is modified based on the first relationship in response to the first ratio being less than the second ratio.

8. The method of claim 5, further comprising:

accessing traffic data indicative of a predicted quantity of data to be received at the second time, wherein the third quantity of data is determined based on the traffic data and the modifying of the current count includes provisioning one or more processing units to process the third quantity of data at least a threshold length of time prior to the second time.

9. The method of claim 5, further comprising:

receiving user input indicative of the second quantity of computing resources, wherein determining the second quantity of computing resources includes accessing the user input.

10. The method of claim 5, further comprising:

determining a target length of time associated with processing of a request;

determining a third quantity of computing resources associated with processing the request within the target length of time; and selecting the second quantity of computing resources to be used by the plurality of processing units to process the third quantity of data based on the third quantity of computing resources associated with processing the request within the target length of time.

11. The method of claim 5, further comprising:
determining that the second count of processing units is greater than a threshold maximum count of processing units, wherein modifying the current count includes setting the current count to equal the threshold maximum count; and
generating a notification indicative of the threshold maximum count.

12. The method of claim 5, further comprising:
determining a second relationship between the second quantity of data and the second quantity of computing resources;
determining that the second relationship differs from the first relationship by at least a threshold value;
determining, based on the second relationship, a fourth quantity of data processed by an individual processing unit of the plurality of processing units using the second quantity of computing resources; and
modifying the current count of processing units based on the second relationship.

13. A system comprising:
one or more memories storing computer-executable instructions; and
one or more hardware processors to execute the computer-executable instructions to:
determine a first quantity of data processed by a plurality of computing devices during a first time period;
determine a first quantity of computing resources used by the plurality of computing devices to process the first quantity of data;
determine a first count of the plurality of computing devices used to process the first quantity of data;
determine a first relationship between the first quantity of data, the first count of the plurality of computing devices, and the first quantity of computing resources, wherein the first relationship includes a first function relating quantities of data with respective quantities of computing resources used to process the quantities of data;
determine a second quantity of data to be processed by the plurality of computing devices during a second time period subsequent to the first time period;
determine a second quantity of computing resources to be used to process the second quantity of data;
determine, based on the first relationship, a third quantity of data processed using an individual computing device of the plurality of computing devices using the second quantity of computing resources;
determine, based on the first relationship, the second quantity of data, and the third quantity of data, a second count of the plurality of computing devices to process the second quantity of data using a quantity of computing resources less than or equal to the second quantity of computing resources; and
modify a current count of the plurality of computing devices based on the second count of computing devices.

14. The system of claim 13, further comprising computer-executable instructions to:
perform one or more of a linear regression analysis or an expectation maximization machine learning algorithm using at least the first quantity of data and the first quantity of computing resources as inputs to determine at least a portion of the first relationship.

15. The system of claim 13, further comprising computer-executable instructions to:
access traffic data indicative of a predicted quantity of data to be processed by the plurality of computing devices during the second time period, wherein the second quantity of data is determined based at least in part on the predicted quantity of data.

16. The system of claim 13, further comprising computer-executable instructions to:
determine a target length of time associated with processing of at least a portion of the second quantity of data; and
determine a third quantity of computing resources associated with processing the at least a portion of the second quantity of data within the target length of time, wherein the second quantity of computing resources is determined based at least in part on the third quantity of computing resources associated with processing the at least a portion of the second quantity of data within the target length of time.

17. The system of claim 13, further comprising computer-executable instructions to:
receive user input indicative of a service level agreement (SLA) for processing the second quantity of data;
determine one or more characteristics of the SLA; and
determine a third quantity of computing resources associated with processing the second quantity of data within the one or more characteristics of the SLA.

18. The system of claim 13, further comprising computer-executable instructions to:
determine a threshold length of time associated with provisioning one or more computing devices of the plurality of computing devices, wherein the current count of computing devices is modified at least the threshold length of time prior to the second time period.

19. The system of claim 13, further comprising computer-executable instructions to:
determine a second relationship between the first quantity of data, the first count of the plurality of computing devices, and the first quantity of computing resources, wherein the first relationship is associated with processing of a first type of data and the second relationship is associated with processing of a second type of data; and
determine that a first ratio of processed data to computing resources associated with the first relationship is less than a second ratio of processed data to computing resources associated with the second relationship, wherein the second count of computing devices is modified based on the first relationship in response to the first ratio being less than the second ratio.

20. The system of claim 13, further comprising computer-executable instructions to:
determine a third quantity of data to be processed by the plurality of computing devices during a third time period subsequent to the second time period;
determine a second relationship between the third quantity of data and the second quantity of computing resources;
determine that the second relationship differs from the first relationship by at least a threshold value; and
modify the current count based on the second relationship.

* * * * *